United States Patent [19]

Kashio

[11] 4,103,334
[45] Jul. 25, 1978

[54] DATA HANDLING SYSTEM INVOLVING MEMORY-TO-MEMORY TRANSFER

[75] Inventor: Toshio Kashio, Tokyo, Japan

[73] Assignee: Casio Computer Co., Ltd., Tokyo, Japan

[21] Appl. No.: 733,776

[22] Filed: Oct. 19, 1976

[30] Foreign Application Priority Data

Oct. 21, 1975 [JP] Japan .................................. 50-125870

[51] Int. Cl.$^2$ .............................................. G06F 13/00
[52] U.S. Cl. .................................................. 364/900
[58] Field of Search ... 364/200 MS File, 900 MS File

[56] References Cited
U.S. PATENT DOCUMENTS 3,911,407  10/1975  Greek, Jr. et al. .................... 364/900

*Primary Examiner*—Raulfe B. Zache
*Attorney, Agent, or Firm*—Flynn & Frishauf

[57] ABSTRACT

A device for controlling the handling of data which comprises a main memory for storing a large number of record data items in a state marked off by record-positioning codes, said respective record data items being formed of series-arranged word data items of variable word length, each containing a plurality (including one) of characters marked off by word-positioning codes, wherein a processing memory is a matrix type formed of columns containing words each having a certain number of characters falling within a specified range and a plurality of rows, and designed to store at least one record data item read out of the main memory; characters constituting the foremost word data item of a record data item read out of the main memory are written with shifting in a given row of the matrix memory, starting with the first character of said word data item; upon detection of a word positioning code immediately following said foremost word data item, the succeeding word data item is written in a row adjacent to said given row of the matrix memory; and readout of data items from the main memory to each row of the matrix memory is brought to an end when a record-positioning code following the last word data item of each row is detected.

2 Claims, 4 Drawing Figures

FIG. 2
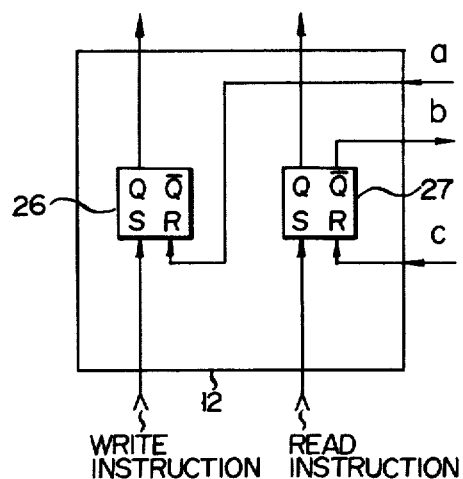
WRITE INSTRUCTION  READ INSTRUCTION
FIG. 3
```
RE              WE           WE         WE RE
⊠ γ γ γ ------γ⊗γ γ----γ⊗----γ⊗⊠γ γ
```
⊠ ---- RECORD END CODE
⊗ ---- WORD POSITIONING CODE
γ ---- CHARACTER
FIG. 4
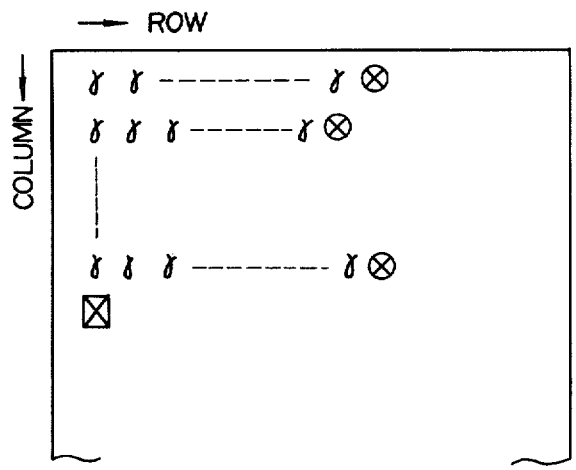

DATA HANDLING SYSTEM INVOLVING MEMORY-TO-MEMORY TRANSFER

BACKGROUND OF THE INVENTION

This invention relates to a device for controlling the handling of data read out of a data-recording medium, such as a drum, disk or tape.

With an electronic computer, data processing is carried out by reading out record datas each formed of a plurality of word datas from said data-recording medium to detect a required record data and further drawing out a specified word data from said required record data. In this case, a main memory such as a drum, disk, or tape stores a series of only effective record datas in the form of the so-called variable word length for efficient utilization of the recording space of said main memory. Record datas are read out in succession from the main memory to be processed. In this case, detection is made of a specified keyword used as a clue in searching for the respective record datas thus read out. A required record data is selected by judging the contents of said keywords. Further, a word data needed for the succeeding arithmetic processing is drawn out of the selected record data to be transferred to an arithmetic processing device. Before record datas read out of the main memory are processed by said arithmetic processing device, it is necessary to select a specified record data and read out a required word data therefrom. Where, with the prior art device, record datas are stored in the main memory in the form of variable word length, then a troublesome process has to be applied in searching for a given specified word data and the reading of said word data has also to be effected through a considerably complicated process, eventually rendering said searching operation extremely time-consuming.

SUMMARY OF THE INVENTION

This invention has been accomplished in view of the above-mentioned circumstances and is intended to provide a device for controlling the handling of data items which enables word data items of variable word length successively read out of a main memory such as a drum, disk, or tape to be stored in said control device, in a state marked off by word positioning codes and record positioning codes, thereby attaining easy, quick arithmetic processing. To this end, this invention provides a device for controlling the handling of data which comprises main memory means for storing a large number of record data items in a state marked off by record data-positioning codes, said record data items being formed of series-arranged word data items of variable word length, each containing a plurality (including one) of characters marked off by word-positioning codes; processing memory means for storing at least one record data item read out of the main memory, said processing memory means being formed of columns containing words each having a certain number of characters falling within a specified range, a plurality of rows, and address control means for effecting the shifting of characters through a column and also the shifting of a row itself; means for writing a record data item read out from the main memory means in the processing memory means, said writing means containing word-positioning code detecting means designed successively to write with shifting the characters of the foremost word data item of a record data item in the first or specified row, starting with the first character of said word data, and also to effect the shifting of a row after writing the word-positioning code, and a command means for supplying the address control means with an instruction for the shifting of a row; and record positioning code-detecting means and control means associated therewith collectively designed to enable a plurality of word data items included in a record data item to be continuously written, until the record data-positioning code is detected.

As previously mentioned, the device of this invention for the handling of data causes data stored in a main memory to be read out in units of a record data, and the data thus read out to be temporarily written in a processing memory in units of word data items in a state shifted from one row to another. Therefore, the data handling-control device of this invention has the advantages that a required word data item included in a record data item can be selected and quickly read out for processing; and arithmetic operations can be very efficiently carried out through judgment of a keyword and selection of a specified word data item, thereby displaying the prominent effect of, for example, accelerating the processing of data and simplifying the handling thereof.

BRIEF DESCRIPTION OF THE DRAWING

FIG. 2 presents a concrete arrangement of the control circuit of FIG. 1;

FIG. 3 sets forth a pattern of various forms of data being handled in the control device of FIG. 1; and FIG. 4 illustrates the manner in which word data items are stored in a processing memory according to the embodiment of FIG. 1.

DESCRIPTION OF THE PREFERRED EMBODIMENTS

Figure 1:
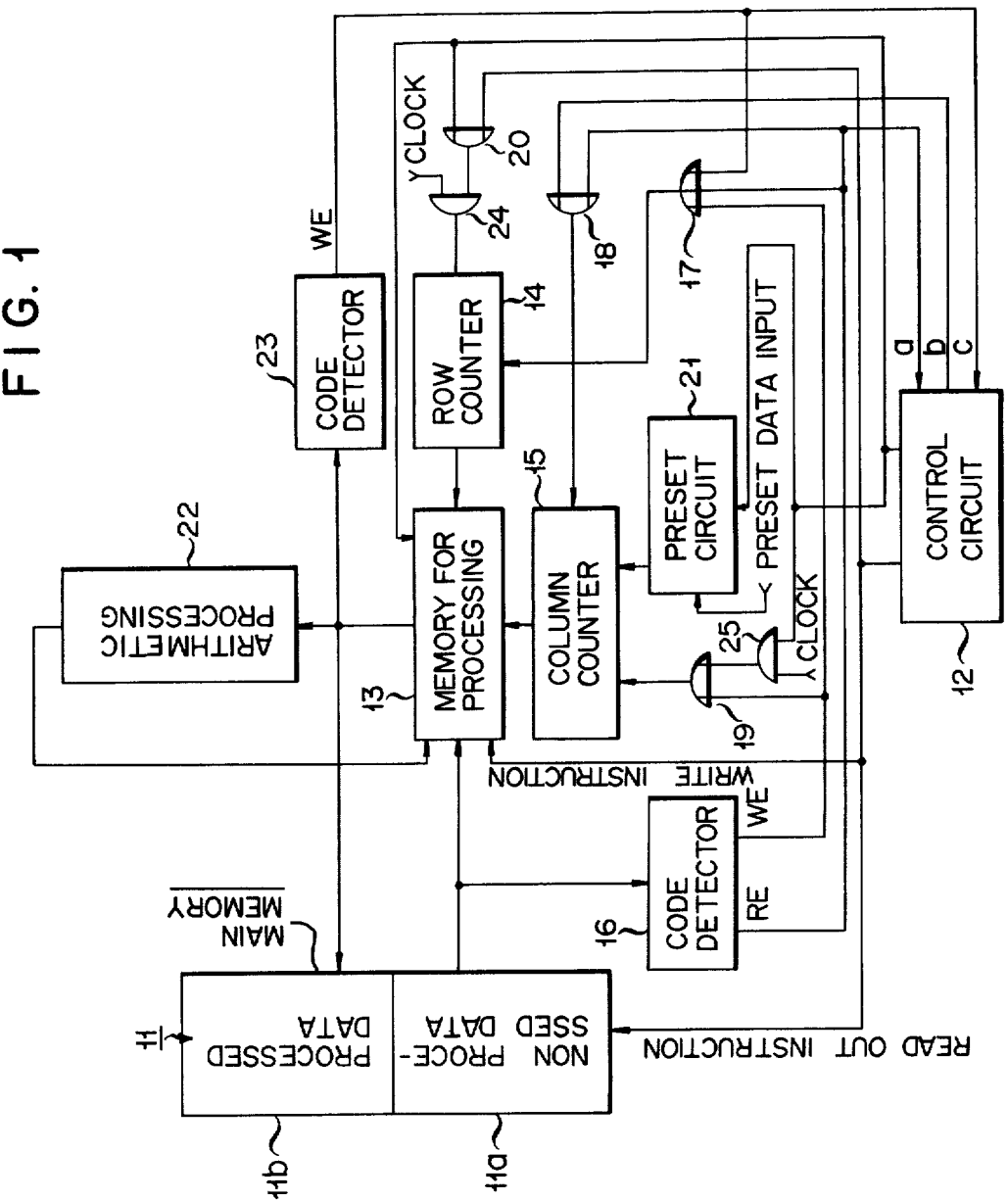
FIG. 1 is a block circuit diagram of a control device embodying this invention for the handling of data.

There will now be described by reference to the appended drawings a control device embodying this invention for the handling of data. FIG. 1 is a block circuit diagram of said control device. A main memory 11 is divided into two sections, for example, a section 11a stored with nonprocessed data and a section 11b stored with processed data. Upon receipt of a read instruction from a control circuit 12, data is read out from the section 11a of nonprocessed data and supplied as write data to a processing memory 13. The section 11a of the main memory 11 is stored, as shown in FIG. 3, with a large number of series-arranged record datas (i.e., record data items) marked off by record-positioning or end codes RE ( $\boxtimes$ ) each of said record datas being formed of a plurality of word datas (i.e., word data items) each containing a plurality of coded characters and arranged in series in a state marked off by word-positioning codes WE ($\boxtimes$). The record datas are read out in succession from the section 11a of the main memory 11.

The row address counter 14 and column address counter 15 specify the addresses of the rows and columns of the processing memory 13, to which the word datas of the record datas are read out from the section 11a of nonprocessed data of the main memory 11 one character after another, starting with the foremost one. The processing memory 13 is a matrix type formed of a large number of semiconductor memories, for example, RAM's, from the specified address of which data is read out, or in the specified data of which data is written.

Data read out from the memory section 11a of nonprocessed data is conducted to a code detector 16, which in turn detects the record data-positioning code RE and word-positioning code WE. A signal RE from the code detector 16 which denotes the detection of the record data-positioning code is delivered to the control circuit 12 as data on an end code of a record data. The arrival of said record end code RE temporarily stops the further reading of data from the memory section 11a of nonprocessed data. This means that the reading of data from said section 11a is carried out in units of recode datas. The control circuit 12 is formed, as shown in FIG. 2, of two flip-flop circuits 26, 27. As signal denoting the detection of a record data-positioning code RE is sent forth as a reset instruction to the row and column address counters 14, 15 through the corresponding OR circuits 17, 18. A signal showing the detection of the word-positioning code WE is supplied to the column address counter 15 as an instruction commanding an advance of "+1" through an OR circuit 19, thereby resetting the row counter 14 through an OR circuit 17. When a read instruction is issue to the memory section 11a of nonprocessed data, then the row address counter 14 receives an advance instruction through an OR circuit 20 and AND circuit 24. As the result, an advance takes place in said row address counter 14 in synchronization with the reading of data from the memory section 11a.

Where the control circuit 12 receives a signal denoting the detection of a record data-positioning code RE to stop the reading of data from the memory section 11a of nonprocessed data, then said control circuit 12 issues a read instruction to the processing memory 13. As the result, an advance takes place in the row address counter 14 through the OR circuit 20 and AND circuit 24. A read instruction from said control circuit 12 is carried to the OR circuit 19 through an AND circuit 25, and further conducted through a preset circuit 21 to advance and preset the column counter 15.

Data read out from the processing memory 13 is supplied to an arithmetic processing device 22 and also stored as processed data in the memory section 11b. A code detector 23 detects the word-positioning code WE of data read out from the processing memory 13. A signal denoting the detection of said word-positioning code WE resets the row address counter 14 through the OR circuit 17 and also is delivered to the control circuit 12. This control circuit 12 stops the reading of data from the processing memory 13 where the column address counter 15 makes an advance and a record data-positioning code RE is detected, and issues a read instruction to the main memory 11.

With the data-handling control device of this invention arranged as described above, a write instruction is sent forth to the set terminal of the flip-flop circuit 26 of the control circuit 12. Then, said flip-flop circuit 26 issues from its Q output terminal a read instruction to the memory section 11a of nonprocessed data of the main memory 11 and a write instruction to the processing memory 13. At this time the row and column address counters 14, 15 are reset, bringing the subject data-handling control device back to the original condition. Data read out from the memory section 11a in a manner illustrated in FIG. 3 has its corresponding address specified by the row address counter 14 which is made to advance by a clock pulse supplied to the AND circuit 24 from the Q set output terminal of the flip-flop circuit 26. Said data read out from the memory section 11a is written in the processing memory 13 starting with the foremost character, with said specified address shifted in the row direction. An address in the column direction of said processing memory 13 in which data is to be written is specified by the column address counter 15. This column address counter 15 makes an advance, each time the code detector 16 detects a word-positioning code WE. Therefore, data is written in the processing memory 13, as shown in FIG. 4, the columns are shifted one after another for each word data, and the addresses in which the characters of the word data are written are shifted in the row direction by the row address counter 14. Thus, the processing memory 13 of this invention enables any of the word datas included in a record data to be selectively read out by specifying a column address. Where one record data is read out from the memory section 1a, and a record-positioning code RE denoting the end of said record data is detected by the code detector 16, then the flip-flop circuit 26 of the control circuit 12 is reset upon receipt of an input a shown in FIG. 2, to prevent a read instruction from being issued to the memory section 11a of nonprocessed data. The row and column address counters 14, 15 are reset upon receipt of an end code RE of a record data.

Where, under this condition, a read instruction is supplied to the set input terminal of the flip-flop circuit 27 included in the control circuit 12, the preset circuit 21 is operated by a signal delivered from the Q output terminal of said flip-flop circuit 27 and the preset circuit 21 receives data, then said data is supplied to the column address counter 15 in synchronization with a clock pulse issued from the AND circuit 25.

When a clock pulse is supplied to the AND circuit 24, then the row address counter 14 is made to advance, causing data to be read out from the processing memory 13 for processing.

Where a signal denoting, for example, the second column of the matrix type processing emmory 13 is supplied to the column address counter 15 through the preset circuit 21, then a word data corresponding to the second column is read out from the processing memory 13 to be processed by the arithmetic operation device 22.

Data processed by said device 22 is written in the processing memory 13 with said second column designated by the column address counter 15. Data read out from the processing memory 13 which has thus been arithmetically processed is stored in the memory section 11b of the main memory 11.

A signal denoting the detection by the code detector 23 of the word positioning code WE of data read out from the processing device 13 is supplied an input C to reset the flip-flop circuit 27 included in the control circuit 12. A signal from the Q output terminal of the flip-flop circuit 27 resets the column address counter 15. Later, another required word data is designated, followed by repetition of the proviously described various operations. Further where, in FIG. 4, one word data has too large a number of characters to be placed in one row having a specified length, then it is advised to write an end code after said row and, upon detection of said end code, store the excess characters in the succeeding column of an extension of said row.

The foregoing description refers to the case where nonprocessed and processed datas are stored in the two sections 11a, 11b of the single main memory 11. However, it is possible to use two separate main memories.

Word datas included in a record data read out from the memory section 11a of the main memory 11 may be stored, after processed, in the memory section 11b thereof, with the sequential order of said word datas rearranged. With the device of this invention for controlling the handling of data, word datas included in a record data read out from the memory section 11a of nonprocessed data of the main memory 11 are temporarily stored in the processing memory 13, for example, formed of the RAM type with different columns allotted to the respective word datas in order to facilicate the subsequent arithmetic operation, thereby enabling said operation to be carried out easily and quickly.

Obviously, this invention read out be respectively used for the above-mentioned object, but can be practised in many other applications without changing the object and scope of the invention.

What is claimed is:

1. A device for controlling the handling of data which comprises:
    main memory means for storing a large number of record data items in a state marked off by record data-positioning codes, said record data items being formed of series-arranged word data items of variable word length, each word data item containing at least one character marked off by word-positioning codes;
    processing memory means for storing at least one record data item read out of the main memory, said processing memory means including columns containing words each having a certain number of characters falling within a specified range, a plurality of rows, and address control means for effecting the shifting of characters through a column and also the shifting of a row itself; and
    means for writing a record data item read out from the main memory means in the processing memory means, said writing means including word-positioning code detecting means for successively writing with shifting the characters of the foremost word data item of a record data item in the first or specified row, starting with the first character of said word data, and also to effect the shifting of a row after writing the word-positioning code, a command means for supplying the address control means with an instruction for the shifting of a row, and record positioning code-detecting means and control means associated therewith for enabling a plurality of word data items included in a record data item to be continuously written, until the record data-positioning code is detected.

2. The control device for the handling of data according to claim 1, which further comprises word-specifying means for determining the sequential positions of word data items included in at least one record data item relative to the respective columns; and control means for specifying the row addresses of the processing memory according to the determined sequential positions of word data items and successively reading out data corresponding to said specified row addresses from the processing memory.

* * * * *